US006623170B2

(12) United States Patent
Petrillo

(10) Patent No.: US 6,623,170 B2
(45) Date of Patent: Sep. 23, 2003

(54) ANGULAR MOUNTED OPTICAL CONNECTOR ADAPTOR FRAME

(75) Inventor: Nicolas Paul Petrillo, New Cumberland, PA (US)

(73) Assignee: FCI Americas Technology, Inc., Reno, NV (US)

(*) Notice: Subject to any disclaimer, the term of this patent is extended or adjusted under 35 U.S.C. 154(b) by 20 days.

(21) Appl. No.: 09/885,821

(22) Filed: Jun. 20, 2001

(65) Prior Publication Data
US 2002/0197017 A1 Dec. 26, 2002

(51) Int. Cl.⁷ .................................................. G02B 6/36
(52) U.S. Cl. .......................................... 385/53; 439/557
(58) Field of Search .............................. 385/53, 55, 60, 385/135, 136, 147; 439/552, 555, 556, 557, 954

(56) References Cited

U.S. PATENT DOCUMENTS

| 2,460,636 | A | | 2/1949 | Holloway | 173/339 |
|---|---|---|---|---|---|
| 3,387,253 | A | | 6/1968 | Salners et al. | 339/102 |
| 4,119,359 | A | | 10/1978 | Schultz | 339/128 |
| 4,669,802 | A | | 6/1987 | Schaffer | 439/535 |
| 4,678,260 | A | * | 7/1987 | Gallusser et al. | 439/607 |
| 5,082,344 | A | | 1/1992 | Mulholland et al. | 385/60 |
| 5,127,082 | A | | 6/1992 | Below et al. | 385/135 |
| 5,302,140 | A | | 4/1994 | Arnett | 439/557 |
| 5,363,465 | A | | 11/1994 | Korkowski et al. | 385/135 |
| 5,363,467 | A | | 11/1994 | Keith | 385/135 |
| 5,372,523 | A | * | 12/1994 | Sakatani et al. | 439/552 |
| RE34,955 | E | | 5/1995 | Anton et al. | 385/53 |
| 5,432,875 | A | | 7/1995 | Korkowski et al. | 385/27 |
| 5,482,476 | A | * | 1/1996 | Watanabe et al. | 439/555 |
| 5,530,954 | A | | 6/1996 | Larson et al. | 385/135 |
| 5,545,061 | A | * | 8/1996 | Sawayanagi | 439/752 |
| 5,757,997 | A | | 5/1998 | Birrell et al. | 385/60 |
| 5,779,500 | A | * | 7/1998 | Tokuwa et al. | 439/557 |
| 5,781,223 | A | | 7/1998 | Sutoh et al. | 347/238 |
| 6,089,909 | A | * | 7/2000 | Tokuwa | 439/557 |
| 6,123,579 | A | * | 9/2000 | Ping | 439/557 |
| 6,210,217 | B1 | * | 4/2001 | Ping | 439/557 |
| 6,508,593 | B1 | * | 1/2003 | Farnsworth et al. | 385/55 |

FOREIGN PATENT DOCUMENTS

| EP | 0 887 893 A3 | 12/1998 |
|---|---|---|
| WO | WO 99/36997 | 7/1999 |

* cited by examiner

Primary Examiner—Lynn Feild
Assistant Examiner—Thanh-Tam Le
(74) Attorney, Agent, or Firm—Woodcock Washburn LLP

(57) ABSTRACT

An angular mounted optical connector frame. The frame comprises a housing open at a front and a rear to form a central passageway along an axis at an oblique angle with respect to the horizon. A pivot is attached to the housing outer portion forward of the housing rear and has an axis of rotation parallel to the horizon but perpendicular to the axis of the central passageway. A stop having a first flat face is attached to the housing outer portion opposite the pivot and aft of the housing front. The frame may further comprise a latch formed by a base section attached to the housing outer portion opposite the pivot forward of the stop and two spring bars that extend in cantilever fashion around the stop and towards the housing rear. Each spring bar has a catch extending away from the stop mounted aft of the base section but forward of its first flat face. The frame may also comprise first and second housings, each having a base, side walls, and a front, joined at the bases thereof to form a single component. The bases and fronts of both the first and second housings are open to first and second cavities formed by the side walls of the first and second housings respectively. A first ridge protrudes from the first housing and defines a mounting notch between itself and the first housing side walls. A second ridge protrudes from the second housing and defines a recession therein for receiving a fastener.

23 Claims, 4 Drawing Sheets

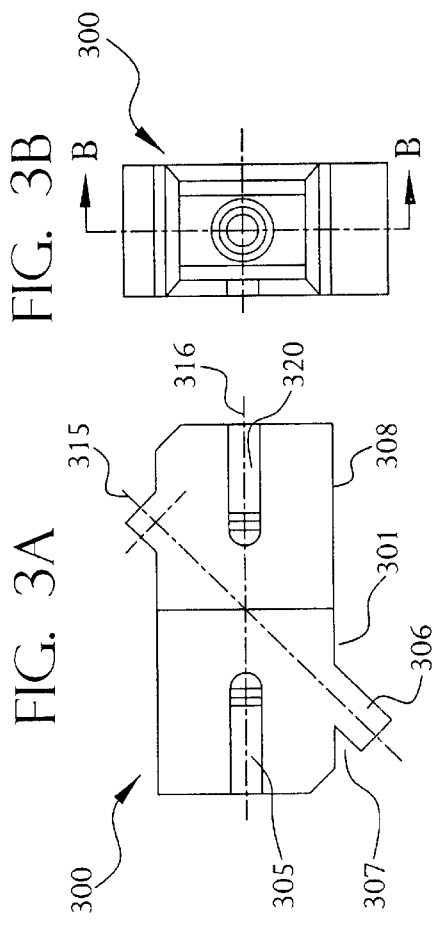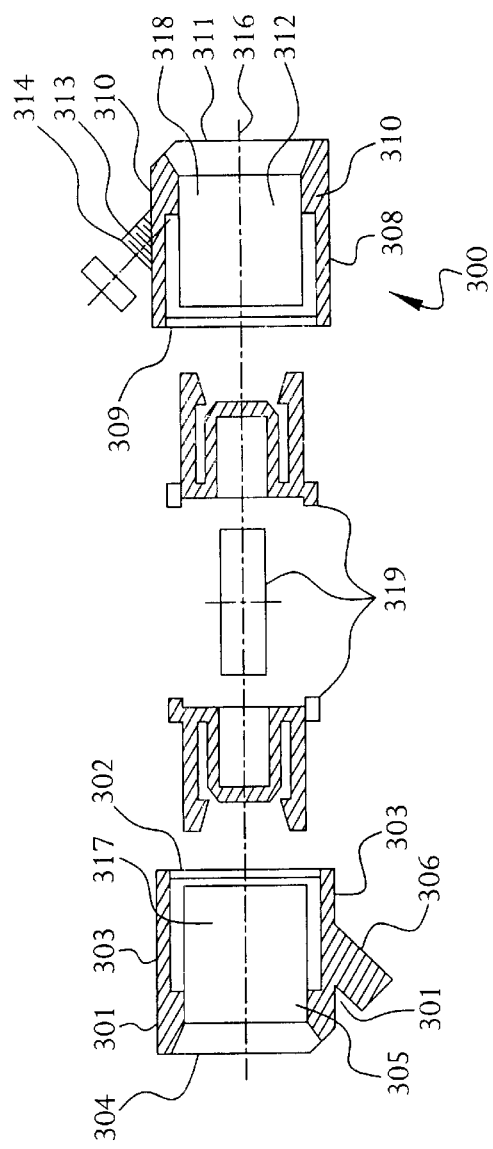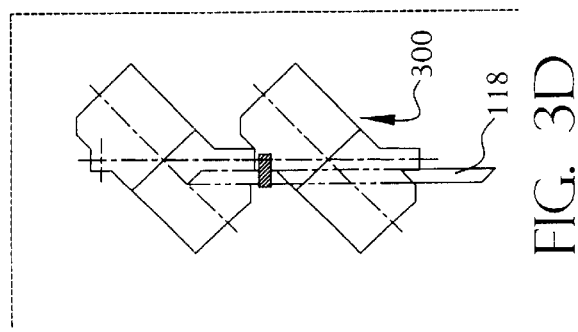

ANGULAR MOUNTED OPTICAL CONNECTOR ADAPTOR FRAME

I. BACKGROUND

A. Field of the Invention

This invention relates generally to the field of panel connectors, and particularly to fiber optic panel connectors and methods of using the same.

B. Description of the Related Art

In electrical closets connections between transmission media are often made through connectors mounted on panels. Typically a panel includes a plate having an array of openings therein. A connector and/or connector adaptor is mounted in each of the openings. The types of connectors employed include copper modular connectors, coaxial connectors, optical fiber connectors, and the like. Often, space is at a premium on these panels. Efforts therefore have been made to maximize the number of connectors that may be employed per unit of panel surface space. One advance as a result of such efforts is the use of a flat panel with angled portions at the points where standard connectors are to be mounted. By placing the connectors at an angle with respect to the face of the panel the vertical space consumed per connector is reduced. The manufacture of a panel with angular connection points however is more difficult and more costly than the manufacture of a simple flat panel. In addition, the use of a panel with angled portions adds to the depth of the electrical cabinet or closet.

It would therefore be advantageous to have a means of mounting connectors to a flat panel at angle without the use of locally angled panel portions.

II. SUMMARY OF THE INVENTION

In one embodiment, the invention comprises a frame for mounting a connector to a flat panel at an angle, the frame comprising a housing open at a front and a rear to form a central passageway along an axis at an oblique angle with respect to the horizon, the central passageway defining an inner portion of the housing, the remaining portion of the housing comprising the outer portion of the housing, a pivot attached to the housing outer portion forward of the housing rear having an axis of rotation parallel to the horizon but perpendicular to the axis of the central passageway, and a stop attached to the housing outer portion opposite the pivot and aft of the housing front, the stop having a first flat face oriented perpendicular to the horizon and open to the housing front. The frame may further comprise a latch formed by a base section attached to the housing outer portion opposite the pivot forward of the stop and two roughly parallel spring bars extending in cantilever fashion around the stop and towards the housing rear from either end of the base section, the spring bars each having a catch extending away from the stop mounted aft of the base section but forward the face of the stop. The pivot may comprise a first ridge forward of a second ridge, the ridges extending away from the outer portion of the housing and defining a slot centered about the axis of rotation of the pivot, the slot comprising a first inner wall corresponding to the first ridge and a second inner wall corresponding to the second ridge. The pivot may also comprise a spring arm extending in cantilever fashion towards the housing front in a plane parallel to the horizon, the spring arm defining a slot therein running perpendicular to the spring arm on a side opposite the housing.

In another embodiment, the invention comprises a frame for mounting a connector assembly to a flat panel at an angle, the frame comprising a first housing, the first housing comprising a base, side walls, and a front, the first housing front being open to a cavity formed by the first housing side walls, a rectangular ridge protruding from one of the first housing side walls along a first axis at an oblique angle to the one of the first housing walls, a face of the rectangular ridge and the one of the first housing walls defining a mounting notch, and a second housing, the second housing comprising a base, side walls, and a front, the second housing base joined to the first housing base, the second housing front being open to a cavity formed by the second housing side walls, a triangular ridge protruding from one of the second housing side walls along an extension of the first axis, the triangular ridge defining a recession therein for receiving a fastener. The side walls of the first and/or second housings may define a key slot therein.

III. BRIEF DESCRIPTION OF THE DRAWINGS

These and other features, aspects, and advantages of the present embodiment of the invention will become better understood with regard to the following description, appended claims, and accompanying drawings where:

FIG. 3A is a side view of a third embodiment of the invention;

FIG. 3B is a front view of a third embodiment of the invention;

FIG. 3C is a sectional view of a third embodiment of the invention;

FIG. 3D is a side view of a third embodiment of the invention mounted to a flat panel.

IV. DETAILED DESCRIPTION OF THE PREFERRED EMBODIMENTS

Throughout the following detailed description similar reference numbers refer to similar elements in all the Figs. of the drawings. Referring to FIGS. 1A–1D, several views of a first embodiment of the invention are shown. Frame 100 is comprised of housing 101*a*, pivot 103*a*, stop 107*a*, and latch 110*a*. Frame 100 may comprise a single plastic injection-molded assembly, or an assembly of a number of components some or all of which may be plastic or other suitable material. Latch 110*a* should be formed of a material that is flexible but does not tends towards plastic deformation easily.

Figure 1A:
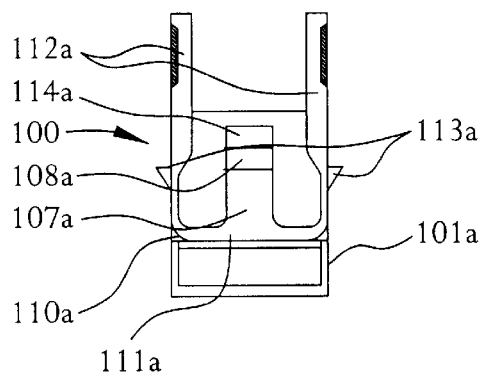
FIG. 1A is a top view of a first embodiment of the invention
Figure 1B:
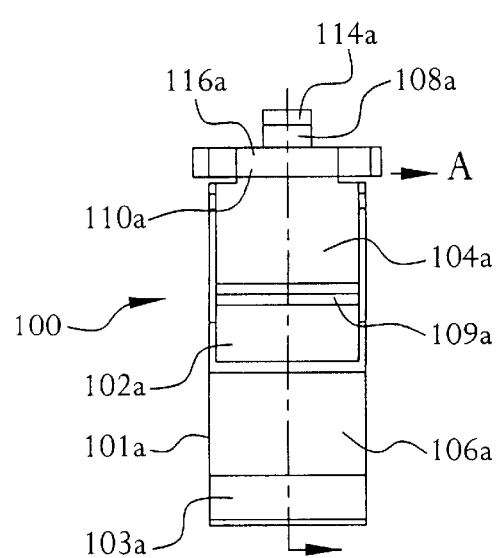
FIG. 1B is a front view of a first embodiment of the invention.
Figure 1C:
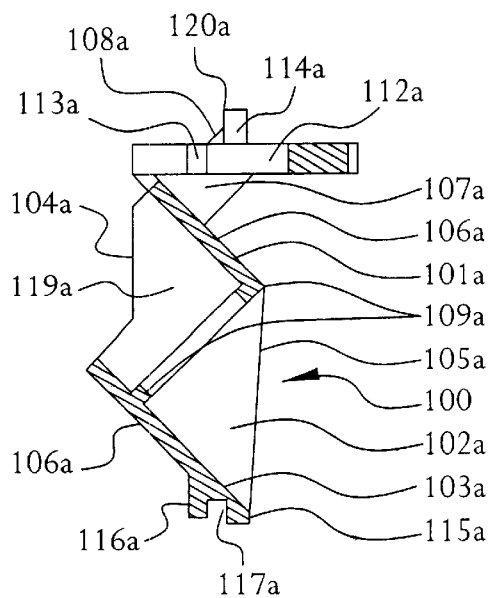
FIG. 1C is a sectional view of a first embodiment of the invention.
Figure 1D:
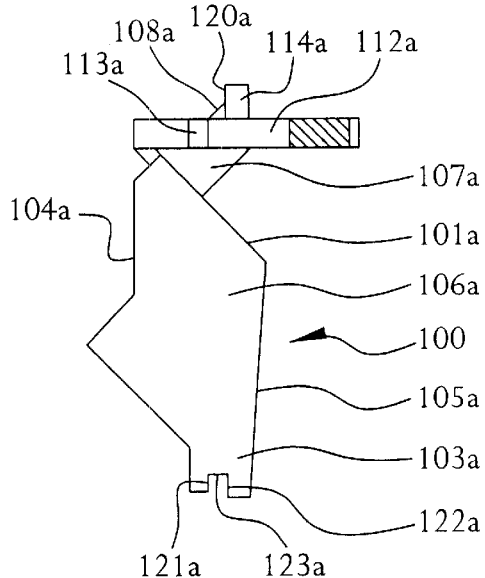
FIG. 1D is a side view of a first embodiment of the invention.
Figure 1E:
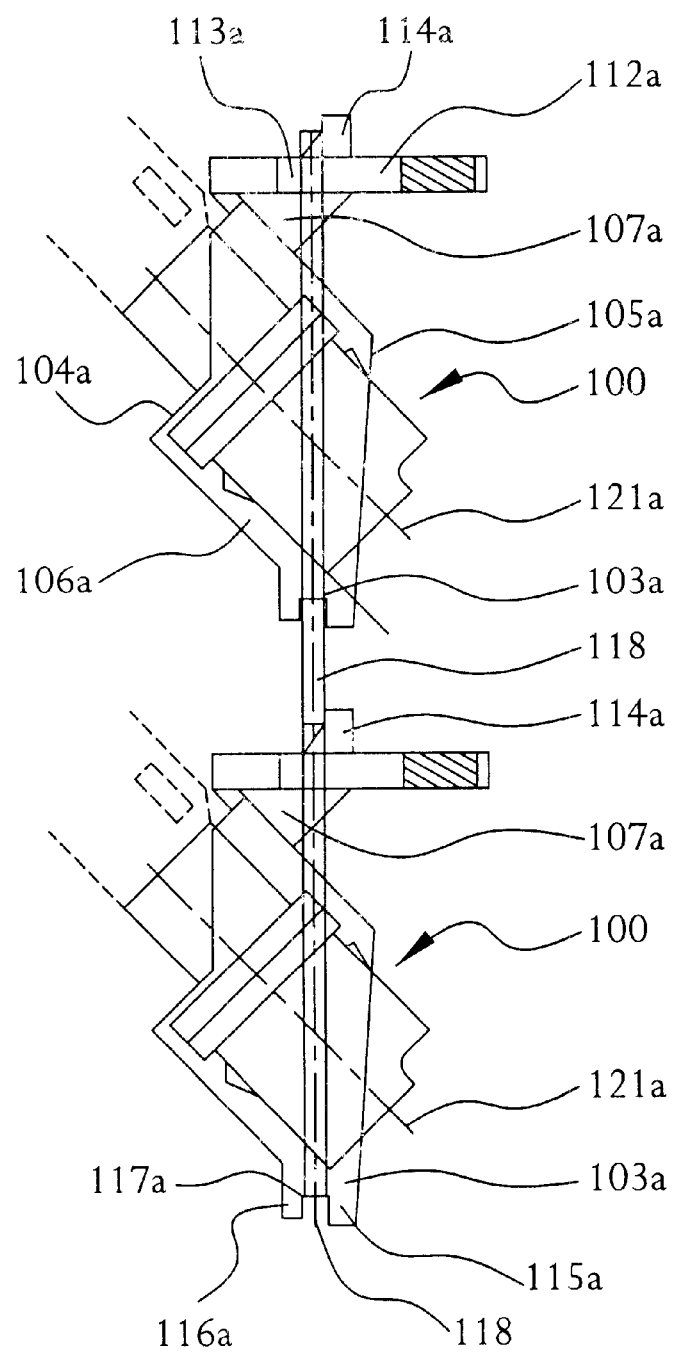
FIG. 1E is a side view of a first embodiment of the invention mounted to a flat parnel.
Figure 2C:
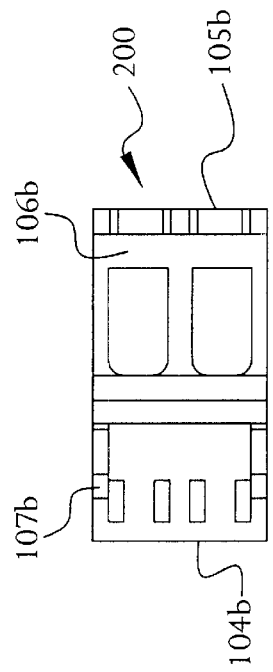
FIG. 2C is a top view of a second embodiment of the invention
Figure 2B:
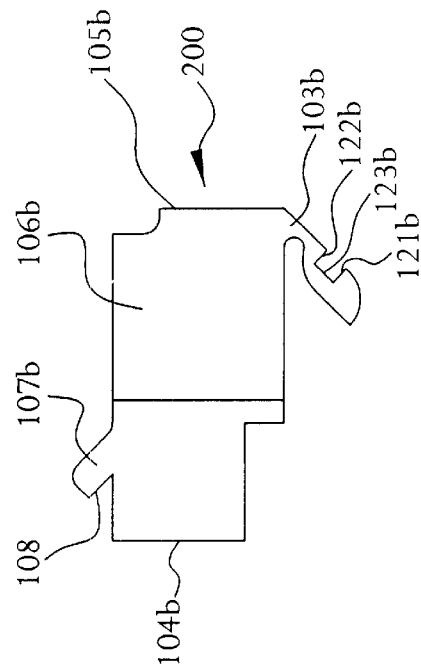
FIG. 2B is a side view of a second embodiment of the invention
Figure 2D:
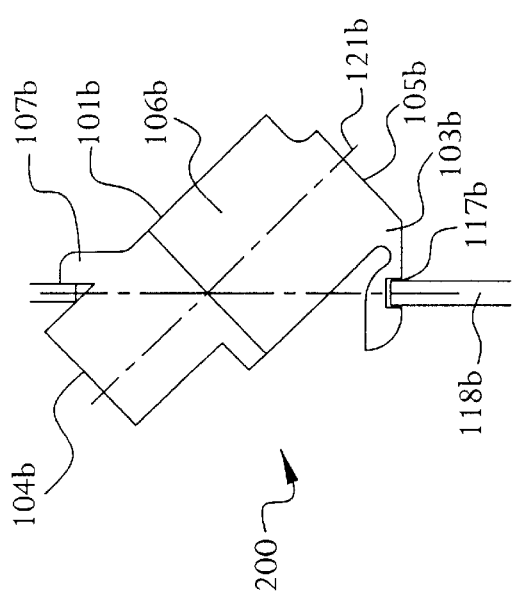
FIG. 2D is a side view of a second embodiment of the invention mounted to a flat panel.
Figure 2A:
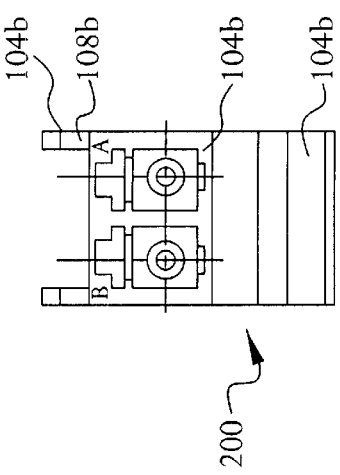
FIG. 2A is a front view of a second embodiment of the invention

Housing 101*a* is open at front 104*a* and rear 105*a* to form central passageway 102*a*. The central axis 121*a* of central passageway 102a should form an oblique angle with the plane of the horizon. Forty-five degrees is optimal, but the oblique angle may be anywhere in the range of 15 to 75 degrees. Central passageway 102a receives and supports two cables joined by connectors or a connector-adaptor assembly when mounted to a flat panel 118 as shown if FIG. 1E. It will be appreciated however that frame 100 is not limited in the number of connector or connector adapter assemblies that it may support. Frame 100 may be constructed to accommodate a single connector assembly up to several connector assemblies. That portion of frame 100 in contact with central passageway 102a comprises housing inner portion 119a. The remaining portions of frame 100 comprise housing outer portion 106a.

Pivot 103a is attached to housing outer portion 106a forward of housing rear 105a. In general, pivot 103a should rotate about an axis parallel to the plane of the horizon but perpendicular to the central passageway central axis 121a. In this embodiment of the invention, the axis of rotation for the pivot also lies in a plane parallel to but aft of a plane extending from first flat face 120a of stop 107a. Pivot 103a is comprised of first ridge 116a and second ridge 115a. Both first ridge 116a and second ridge 115a extend away from housing outer portion 106a and define slot 117a. In general, slot 117a may be comprised of one or more inner walls. In this embodiment of the invention slot 117a is comprised of first inner wall 121a corresponding to first ridge 116a, second inner wall 122a corresponding to second ridge 115a, and upper wall 123a which connects first inner wall 121a and second inner wall 122a. Slot first and second inner walls 121a, 122a may extend away from slot upper wall 123a different distances. In this embodiment slot first inner wall 121a extends away from slot upper wall 123a a distance less than the distance slot second inner wall 122a extends away from slot upper wall 123a. The advantage of having slot first inner wall 121a extend a distance less than slot second inner wall 122a is ease of mounting frame 100 to panel 118.

Stop 107a is attached to housing outer portion 106a opposite pivot 103a and aft of housing front 104a. Stop 107a also has a flat face 120a oriented perpendicular to the horizon and open to housing front 104a. In this embodiment of the invention, stop 107a has a first section 107a extending from housing outer portion 106a perpendicular to the axis of central passageway 102a for a first distance, a second section 114a extending from first section 107a for a second distance, first flat face 120a is defined by second section 114a, and the first distance is greater than the second distance. In any event, it is preferable to have the axis of rotation of pivot 117a lying in a plane parallel to but aft of a plane extending from first flat face 120a. This ensures that frame 100 is horizontally aligned once inserted in panel 118.

Latch 110a is comprised of base section 11a and spring bars 112a. Base section 111a is attached to housing outer portion 106a opposite pivot 103a and forward of stop 107a. Spring bars 112a are mounted to either end of base section 111a and extend in cantilever fashion around stop 107a towards housing rear 105a. On each of spring bars 112a is a catch 113a extending away from stop 107a mounted aft of base section 11a but forward first flat face 120a. Catch 113a engages the rear face of panel 118 when frame 100 is mounted to panel 118. While catch 113a may take any number of forms, in this embodiment of the invention catch 113a comprises a ridge having first and second sides, the first side faces towards but slopes away from housing front 104a, and the second side faces towards housing rear 105a and forms a plane perpendicular to the central passageway central axis 121a.

To mount frame 100 to panel 118, a user facing panel 118 places frame 100 at angle towards himself with slot 117a of pivot 103a straddling the lower edge of an opening in panel 118. The user then squeezes spring arms 112a towards each other and rotates frame 100 on pivot 103a until first flat face 120a of stop 107a engages the front surface of panel 118. Spring arms 12a are released and catches 113a engage the rear surface of panel 118. It will be appreciated that the design of frame 100 provides at least five points of retention: first flat face 120a and the upper outer surface of panel 118; catch 113a second side faces and the upper inner surfaces of panel 118; pivot 103a first inner wall 121a and lower inner surface of panel 118; and pivot 103a second inner wall 122a and lower outer surface of panel 118. Prior art connector frames typically provide only two retention points.

Referring now to FIGS. 2A–2D, several views of a second embodiment of the invention are shown. Frame 200 is comprised of housing 101b, pivot 103b, and stop 107b. Frame 200 may comprise a single plastic injection-molded assembly, or an assembly of a number of components some or all of which may be plastic or other suitable material. The spring arm portion of pivot 103b should be formed of a material that is flexible but does not tends towards plastic deformation easily.

Housing 101b is open at front 104b and rear 105b to form a central passageway (not shown). The central axis 121b of the central passageway should form an oblique angle with the plane of the horizon. Forty-five degrees is optimal, but the oblique angle may be anywhere in the range of 15 to 75 degrees. The central passageway receives and supports four cables joined by two connector or connector adapter assemblies when mounted to a flat panel 118 as shown if FIG. 2D. It will be appreciated however that frame 200 is not limited in the number of connector or connector adapter assemblies that it may support. Frame 200 can be constructed to accommodate a single connector assembly up to several connector assemblies. That portion of frame 200 in contact with central passageway 102b comprises the housing inner portion (not shown). The remaining portions of frame 200 comprise housing outer portion 106b.

Pivot 103b is attached to housing outer portion 106b forward of housing rear 105b. In general, pivot 103b should rotate about an axis parallel to the plane of the horizon but perpendicular to central passageway central axis 121b. In this embodiment of the invention, the axis of rotation also lies in a plane parallel to but aft of a plane extending from first flat face 120b of stop 107b, and pivot 103b comprises a spring arm extending in cantilever fashion towards housing front 104b in a plane parallel to the horizon. The spring arm of pivot 103b defines a slot 117b therein that runs perpendicular to the spring arm on a side thereof opposite housing 101b. In general, slot 117b may comprise one or more inner walls. In this embodiment of the invention, slot 117b comprises first inner wall 121b, second inner wall 122b, and upper wall 123b which connects first inner wall 121b and second inner wall 122b.

Stop 107b is attached to housing outer portion 106b opposite pivot 103b and aft of housing front 104b. Stop 107b also has a flat face 120b oriented perpendicular to the horizon and open to housing front 104b. It is preferable to have the axis of rotation of pivot 117b lying in a plane parallel to but aft of a plane extending from first flat face 120b. This ensures that frame 200 is horizontally aligned once inserted in panel 118.

To mount frame 200 to panel 118, a user facing panel 118 places frame 200 at angle towards himself with slot 117b of pivot 103b straddling the lower edge of an opening in panel 118. The user then depresses housing 101b towards panel 118 and away from himself, thereby causing housing 101b to rotate about the axis of rotation of pivot 103b, until housing front 104b is behind the rear surface of panel 118. Once housing front 104b is behind the rear surface of panel 118 the user ceases to depress housing 101b and allows the action of pivot 103b spring arm to raise housing 101b vertically until first flat face 120b of stop 107b engages the upper outer face of panel 118 and a section of housing outer portion 106b forward of stop 107b engages the upper inner face of panel 118. It will be appreciated that the design of frame 200 provides at least four points of retention: first flat face 120a and the upper outer surface of panel 118; housing outer portion 106b forward of stop 107b and upper inner face of panel 118; slot 117b first inner wall 121b and lower inner surface of panel 118; and slot 117b second inner wall 122b and lower outer surface of panel 118.

Referring now to FIGS. 3A–3D, several views of a third embodiment of the invention are shown. Frame 300 is comprised of first housing 301 and second housing 308. First housing 301 is comprised of base 302, side walls 303, and front 304. First housing front 304 and base 302 are open to first cavity 317 formed by first housing side walls 303. A rectangular ridge 306 protrudes from one of the first housing side walls 303 along axis 315 which forms an oblique angle with the one of the first housing side walls 303. Forty-five degrees is optimal, but the oblique angle may be anywhere in the range of 15 to 75 degrees. A face of rectangular ridge 306 and the one of the first housing side walls 303 define mounting notch 307. It will be appreciated that ridge 306 need not be rectangular in shape but may take a variety of different forms.

Second housing 308 is comprised of base 309, side walls 310, and front 311. Second housing front 311 and base 309 are open to second cavity 318 formed by second housing side walls 310. A triangular ridge 313 protrudes from one of the second housing side walls 310 opposite rectangular ridge 306 along an extension of axis 315. It will be appreciated that ridge 313 need not be triangular in shape but may take a variety of different forms. Triangular ridge 313 defines recession 314 therein for receiving a fastener such as a screw or the like. First housing 301 and second housing 308 are joined at bases 302, 309, and together first cavity 317 and second cavity 318 enclose and support push-pull type fiber optic connector 319. In this embodiment of the invention, at least one of the first and second housing side walls 303, 308 define key slots 305, 320 therein. Key slot 305 and/or 320 are optional however and need not be present in every embodiment of the invention.

First and second housings 301, 308, together with the ridges protruding therefrom, may each comprise a single plastic injection-molded assembly or an assembly of a number of components some or all of which may be plastic or some other suitable material.

To mount frame 300 to panel 118, a user inserts the frame through the panel and then applies downward force to the frame thereby mating groove 307 to panel 118. The user then secures frame 300 to panel 118 with a fastener that threads into or attaches to recession 314.

While the invention has been described in connection with the embodiments depicted in the various figures, it is to be understood that other embodiments may be used or modifications and additions may be made to the described embodiments for performing the same function of the invention without deviating therefrom. Therefore, the invention should not be limited to any single embodiment, but rather construed in breadth and scope in accordance with the claims appended below.

I claim:

1. A frame for mounting a connector at an angle to a flat panel, comprising:
    a housing open at a front and a rear to form a central passageway along an oblique axis with respect to the horizon;
    a pivot forward of the housing rear having an axis of rotation parallel to the horizon but perpendicular to the oblique axis of the central passageway;
    a stop opposite the pivot and aft of the housing front, the stop having a first flat face oriented perpendicular to the horizon and open to the housing front; and
    a latch formed by a base section opposite the pivot forward of the stop and two roughly parallel spring bars extending in cantilever fashion around the stop and towards the housing rear front either end of the base section, the spring bars each having a catch extending away from the stop mounted aft of the base section but forward the face of the stop.

2. The frame of claim 1, further comprising a connector stop extending into the central passageway.

3. The frame of claim 2, wherein the connector stop comprises a ridge.

4. The frame of claim 1, wherein the stop has a first section extending from the housing perpendicular to the oblique axis of the central passageway for a first distance and a second section extending from the first section for a second distance, the second section comprising the first flat face.

5. The frame of claim 4, wherein the first distance is greater than the second distance.

6. The frame of claim 4, wherein the first section has a second flat face open to the housing front.

7. The frame of claim 5, wherein the axis of rotation of the pivot lies in a plane parallel to but aft of a plane extending from the first flat face of the stop.

8. The frame of claim 5, wherein the pivot comprises a first ridge forward of a second ridge, the ridges extending away from the housing and defining a slot centered about the axis of rotation of the pivot, the slot comprising a first inner wall corresponding to the first ridge and a second inner wall corresponding to the second ridge.

9. The frame of claim 8, wherein the slot further comprises an upper wall connected to and between the first and second inner walls.

10. The frame of claim 8, wherein the slot first inner wall extends a first distance away from the slot upper wall and the slot second inner wall extends a second distance away from the slot upper wall, the first distance being different from the second distance.

11. The frame of claim 10, wherein the first distance is less than the second distance.

12. The frame of claim 1, wherein each catch comprises a ridge having first and second sides, the first side facing towards but sloping away from the housing front.

13. The frame of claim 12, wherein the catch second side faces towards the housing rear and is perpendicular to the oblique axis of the housing central passageway.

14. The frame of claim 1, wherein the pivot comprises a spring arm extending in cantilever fashion towards the housing front in a plane parallel to the horizon, the spring arm defining a slot therein running perpendicular to the spring arm on a side opposite the housing.

15. The frame of claim 14, wherein a centerline of the slot lies in a plane parallel to but aft of a plane extending from the first flat face of the stop.

16. The frame of claim 1, wherein the oblique angle is in the range of 15 to 65 degrees.

17. A method of mounting a connector at an angle to the face of a flat panel with a hole, comprising:

providing a frame open at a front and a rear to form a central passageway along an oblique axis with respect to the horizon, the frame further comprising a pivot, a stop, and a latch formed by a base section opposite the pivot forward of the stop and two roughly parallel spring bars extending in cantilever fashion around the stop and towards the housing rear from either end of the base section, the spring bars each having a catch extending away from the stop mounted aft of the base section but forward the face of the stop, each of the catches engaging the flat panel on the side opposite the stop once the stop engages the panel;

placing the connector within the central passageway of the frame;

positioning the connector within the hole, the pivot resting on an edge of the mounting hole; and rotating the frame towards the panel on the pivot until the stop engages the panel.

18. The method of claim 17, further comprising the step of removing the frame from the panel by squeezing the spring bars and rotating the frame away from the panel on the pivot.

19. The method of claim 17, wherein the stop has a first section extending from the housing perpendicular to the oblique axis of the central passageway for a first distance and second section extending from the first section for a second distance, the second section comprising the first flat face.

20. The method of claim 19, wherein the first distance is greater than the second distance.

21. The method of claim 19, wherein the first section has a second flat face open to the housing front.

22. The method of claim 17, wherein the axis of rotation of the pivot lies in a plane parallel to but aft of a plane extending from the first flat face of the stop.

23. The method of claim 17, wherein the pivot comprises a first ridge forward of a second ridge, the ridges extending away from the frame and defining a slot centered about the axis of rotation of the pivot.

* * * * *